(12) United States Patent
Naydon et al.

(10) Patent No.: US 7,463,565 B2
(45) Date of Patent: Dec. 9, 2008

(54) METHOD OF STORING ROTATING MEDIA DATA IN IMAGE FILE

(75) Inventors: Andriy Naydon, Dnepropetrovsk (UA); Sergiy Naydon, Dnepropetrovsk (UA)

(73) Assignee: DT Soft Ltd. (BZ)

( * ) Notice: Subject to any disclaimer, the term of this patent is extended or adjusted under 35 U.S.C. 154(b) by 606 days.

(21) Appl. No.: 11/214,601

(22) Filed: Aug. 30, 2005

(65) Prior Publication Data

US 2007/0047393 A1 Mar. 1, 2007

(51) Int. Cl.
*G11B 15/04* (2006.01)
(52) U.S. Cl. .................. 369/53.2; 369/53.41
(58) Field of Classification Search .............. None
See application file for complete search history.

(56) References Cited

U.S. PATENT DOCUMENTS

| | | | |
|---|---|---|---|
| 5,247,498 A | 9/1993 | Takekoshi | |
| 5,247,499 A | 9/1993 | Hayashi | |
| 5,261,072 A * | 11/1993 | Siegel | 710/22 |
| 5,708,632 A | 1/1998 | Totsuka | |
| 5,914,916 A | 6/1999 | Totsuka | |
| 6,195,325 B1 * | 2/2001 | Okanishi | 369/124.08 |
| 6,349,077 B1 | 2/2002 | Smelt | |
| 6,680,884 B1 | 1/2004 | Niessen | |
| 6,693,869 B1 | 2/2004 | Ballantyne | |
| 6,804,176 B1 | 10/2004 | Komazaki | |

* cited by examiner

*Primary Examiner*—Paul Huber
(74) *Attorney, Agent, or Firm*—Galbreath Law Offices, P.C.; John A. Galbreath (57) ABSTRACT

A method and system are disclosed for retrieving data from rotating media such as an optical disk, and storing that data in an image file or files which contain not only the data but also physical information about the media, including the angular location of each data sector along the rotating media's spiral track. The image file or files can then be copied onto a variety of diverse media, including semiconductor media (RAM, ROM, etc.), a hard disk residing on a computer, optical or magnetic media (CD-ROM, DVD, BD-ROM, HD-DVD, floppies, etc.), and the like.

20 Claims, 4 Drawing Sheets

```
10 ──  Send read commands to media-reading device,
        disabling device caching if needed.
              │
              ▼
11 ──  Measure relative execution time/
        response time to read commands.
              │
              ▼
12 ──  Calculate media rotation speed, spiral curve equation,
        and relative angle position of data sectors.
              │
              ▼
13 ──  Fine-tune curve parameters and smooth
        curve. Re-measure if needed.
              │
              ▼
14 ──  Create curve angle table and store in
        media descriptor file.
              │
              ▼
15 ──  Copy media descriptor file to memory or
        other media.
```

FIGURE 3 x-axis: sector number (in hex format)
y-axis: angle occupied by one sector

FIGURE 4

METHOD OF STORING ROTATING MEDIA DATA IN IMAGE FILE

BACKGROUND

1. Field of the Invention

The invention is in the area of dynamic information storage or retrieval, specifically retrieving data from rotating media such as an optical disk, including physical information about the media itself, and storing that data and physical information in image files.

2. Description of the Related Art

Various methods of reading data from rotating media, and representing the location of the data on the media, have been disclosed in the prior art. Various methods of making an image file of the data content of the rotating media have also been disclosed. However, conventional technologies for making an image file, encountered in many applications, concern only the media content and not the physical parameters of the media. These applications store only the general logical layout (Table of contents, TOC) of the media and the data itself. Such an approach has only limited usage and does not allow a user to backup special types of media with complex physical parameters (e.g., protected media).

U.S. Pat. No. 6,693,869 to Ballantyne discloses a program that locates files on optical media disks, and computes an image file that defines where data will be located on the optical disk. But the method of locating the files on the disk does not involve measuring the radial angle of each data sector along the spiral track.

U.S. Pat. Nos. 5,708,632 and 5,914,916, both to Totsuka, disclose measuring the angle along the spiral track, and discuss that the distance between data sectors can be represented by an angle measured in radians. However, these patents do not disclose representing each data sector's location along the spiral track with a radial angle measurement from a given reference point, and then using that radial angle information as part of an image file.

In addition, U.S. Pat. No. 6,349,077 to Smelt; U.S. Pat. No. 6,680,884 to Niessen; U.S. Pat. No. 5,247,498 to Takekoshi; U.S. Pat. No. 5,247,499 to Hayashi; and U.S. Pat. No. 6,804,176 to Komazaki disclose apparatuses and methods for scanning an optical disk and accessing the data it contains, using various navigation parameters, seek algorithms, track searches, etc. But none of these patents disclose the angle navigation parameter of the invention, wherein each data sector's location along the rotating media's spiral track is represented by a radial angle measurement.

No prior art patents show the method of the instant invention—that is, storing physical information about rotating media data in an image file by determining the angular position of each data sector on the media's spiral track and storing this information as part of the image file. No prior art image format stores this physical information in an image file, and indeed, the particular topology measurement used in the invention—representing each data sector's location along the spiral track with a radial angle measurement from a given reference point—does not exist in the prior art.

SUMMARY OF THE INVENTION

The invention concerns dynamic information storage or retrieval. It is a method for retrieving data from rotating media such as an optical disk, and storing that data in image files which contain not only the data but also physical information about the media, including the angular location of each data sector along the rotating media's spiral track as measured from the first data sector. The image files or files can then be copied onto a variety of diverse media, including semiconductor media (RAM, ROM, etc.), a hard disk residing on a computer, optical or magnetic media (CD-ROM, DVD, floppies, etc.), and the like.

Several objects and advantages of the invention are:

In addition to storing the data content of rotating media in an image file, the invention also stores physical characteristics of the media itself, including how the data is located on the original media—thus allowing the user to reproduce exact properties of the original media in conventional read access devices, and to backup even sophisticated types of media.

It is a further object of the invention to provide an optimal method of analyzing the media surface and measuring the media topology, i.e., the position of the data across all user-addressable areas on the media.

It is a further object of the invention to provide a method whereby one may reproduce exact media behavior (content, timings, etc.) without losing the originality of the behavior.

It is a further object of the invention that the image file or files contain enough information to reproduce the original media in case of loss or destruction, and can be saved for backup purposes on different storage types (e.g., hard disk, optical or magnetic disk, network, etc.).

Further objects and advantages of the invention will become apparent from a consideration of the ensuing description and drawings.

DETAILED DESCRIPTION OF THE INVENTION

The following provides a list of the reference characters used in the drawings:

10. Sending step
11. Measuring step
12. Calculating step
13. Fine-tuning step
14. Storing step
15. Copying step
16. Computer
17. Processing unit
18. System memory
19. RAM
20. ROM
21. Hard drive
22. CD-R/RW drive
23. DVD±R/RW drive
24. Floppy drive
25. Wide area network (WAN)
26. Local area network (LAN)
27. Monitor
28. Mouse
29. Keyboard
30. Rotating media
31. Spiral track
32. First data sector
33. Second data sector
34. Second data sector angle
35. Third data sector 36. Third data sector angle
37. Internet The present invention is directed to a method of creating a media image which contains not only the actual data on the media but also contains the media's physical characteristics/topology. The topology measurement determines the location of the data sectors on the media in terms of a data sector's radial angle from a given reference point, and this takes into account different anomalies in some parts of media like varying track pitch and density, ECC errors, sectors non-conforming to official standards etc.

Figure 2:
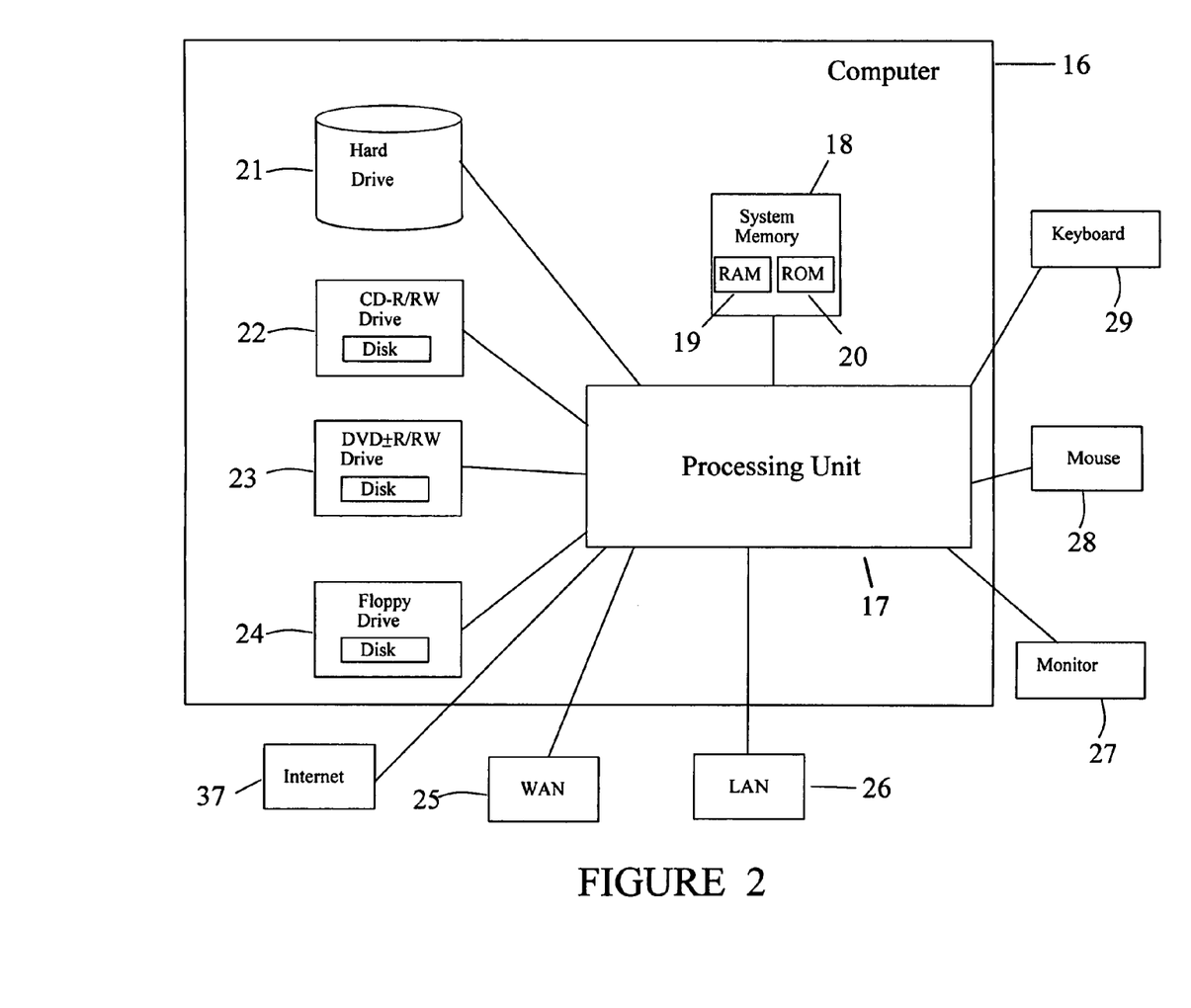
FIG. 2 is a diagram showing the various computer components through which the method is performed.

The invention can be used, for example, with the computer 16 shown in FIG. 2. Computer 16 has a central processing unit 17, to which are attached various internal components, network connections, an Internet connection, and peripherals. Computer 16 contains a system memory 18, including both RAM 19 and ROM 20, to which the image file can be written; a hard drive 21, to which the image file can be written; and a CD-R/RW drive 22, a DVD±R/RW drive 23, and a floppy drive 24. All these drives can be used as media-reading devices as well as devices to which the image file can be written. The image file can also be transmitted over a WAN 25, a LAN 26, or any other suitable network including the Internet 37. Finally, monitor 27, mouse 28, and keyboard 29 provide the peripheral devices through which the user can perform the method steps. The application software that performs the method can reside, for example, in the system memory 18; or be on the hard drive 21, the CD-R/RW drive 22, the DVD±R/RW drive 23, or the floppy drive 24; or be accessed via a network, the Internet, or any other suitable source.

In general, the method involves analyzing the media type and its layout, analyzing the media surface for anomalies and special cases, analyzing the media topology, and then transferring the data content and the media physical characteristics from the media and storing them in one or more image files.

Based on information about the general media structure and its physical parameters, a decision is made concerning the additional information to be stored in the image file. Depending on media type, the surface analysis may be combined with data transfer for purposes of optimization.

The rotating media is typically a disc with a continuously recorded spiral track beginning near the center and spiraling outward, which can be described by known mathematical equations. The density of sectors on this spiral and their distance between each other depends on the type of media and how it was manufactured, and this is what makes each media unique. Types of rotating media on which the method can be employed include, but are not limited to, CD-ROM, DVD-ROM, BD-ROM, HD-DVD, and the like, including rewritable versions of these formats.

The invention uses a Data Position Measurement module (hereinafter referred to as "DPM") to perform the measurement of all angles along the spiral track, and the invention then stores these angle measurements in the media descriptor file (hereinafter referred to as "MDS"). The image is made up of this MDS file portion, as well as another file portion which contains the media data content (hereinafter referred to as "MDF"). In other words, the image may be thought of as two files (an MDS portion and an MDF portion), or alternatively the media physical information/angle measurements may be stored together with the media data content in a single image file.

Figure 1:
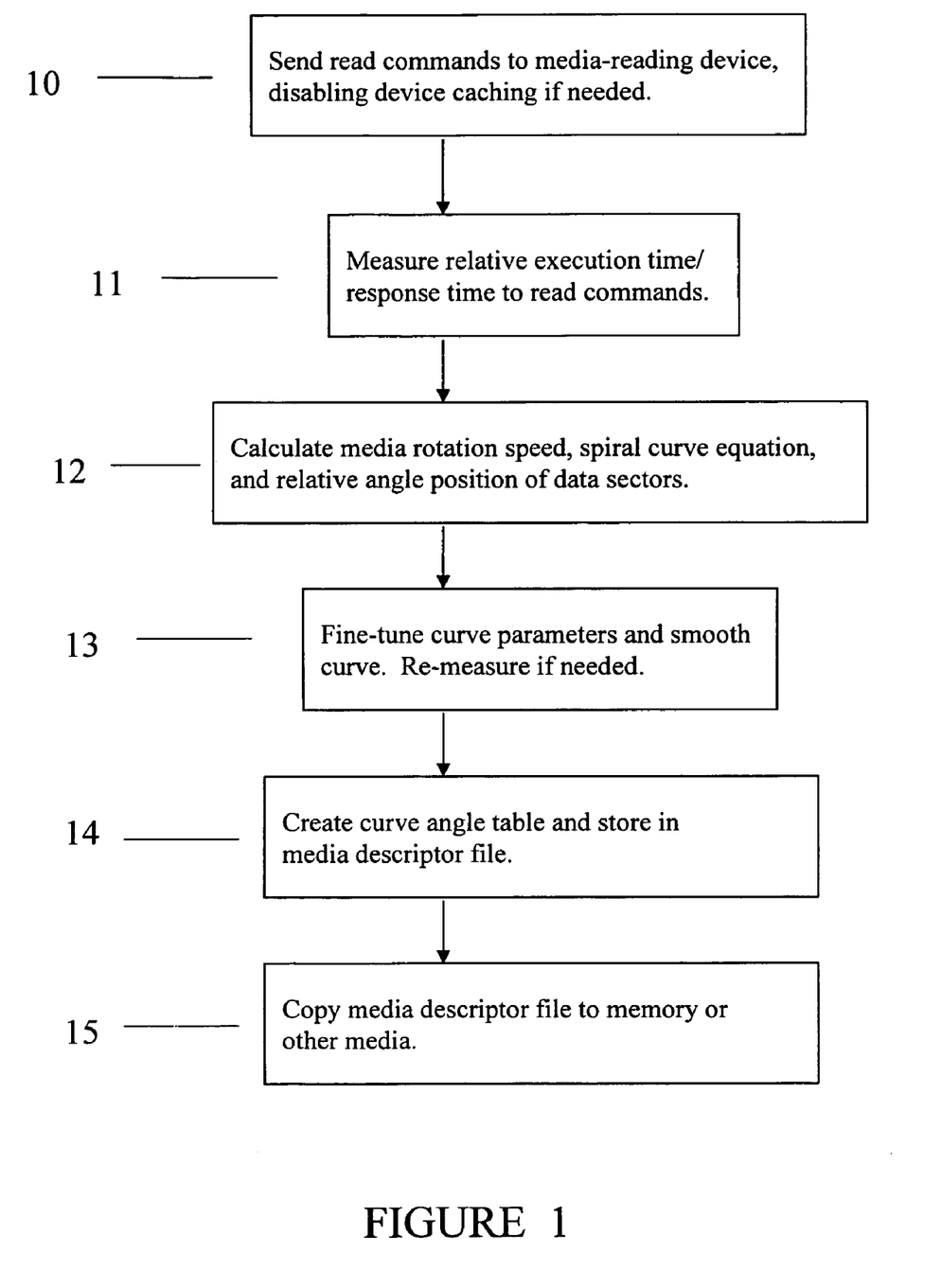
FIG. 1 is a flow chart of the method steps.

The process steps are summarized in FIG. 1. First is the sending step 10, wherein read commands are sent to the media-reading device containing the rotating disk. If needed, any caching by the device is disabled or bypassed. Second is the measuring step 11, wherein the relative execution time (the response time to the read commands) is measured. Third is the calculating step 12, wherein the media rotation speed, the equation of the spiral curve including curve coefficients, and the relative angle position of the data sectors are determined. Fourth is the fine-tuning step 13, wherein the curve parameters are adjusted as needed for greater accuracy, and the curve is smoothed using regression techniques. Fifth is the storing step 14, wherein a curve angle table is created with entries containing the data sector angles/positions. This curve angle table is stored in an MDS file. Sixth is the copying step 15, wherein the MDS file is copied to memory or other media as part of the image. The other part of the image, of course, is the MDF file portion which contains the media data content. The MDS and MDF files, taken together, represent a complete image of the rotating media—its data content as well as its physical characteristics/topology.

Additional detail on each step in the process follows:

The DPM module calculates the media rotation speed in the media-reading device at different locations, by sending a special series of commands and measuring the timing of the response to these commands as precisely as possible.

This DPM step of rotation speed and angle measurement involves sending the following read commands, which depend on media type, underlying track containing data and actual media-reading device capabilities:

a) READ CD (BEh, see 6.24 READ CD Command in MMC-4 draft)
b) READ10 (28h, see 6.19 READ (10) Command in MMC-4 draft).
c) READ12 (A8h, see 6.20 READ (12) Command in MMC-4 draft).

The above commands are based on the MMC-4 multimedia command set, which contains the standard fourth-generation command set for multi-media devices. The MMC-4 command set may be found on the website http://www.t10.org, and specific information about the command set follows: {Date: 2005/05/04, Rev: 05a, Status: INCITS Approval, Project: 1545-D, File: mmc4r05a.pdf (3502318 bytes)}.

The MMC-5 standard is currently in development, and when it is completed it is of course anticipated that the commands sent by the DPM module can also be consistent with that and later standards.

The process can read a number of blocks simultaneously from the media-reading device (1, 2 or more sectors), and the number of blocks simultaneously read may be optimized according to the current device firmware for a more stable read.

The DPM module performs a measurement of the relative execution time of these commands (actual returned data is irrelevant), i.e., measures differences in the times it took to execute the commands.

As an example, if the result for reading sector A was obtained at XX min XX sec 17 ms absolute time and the result for reading sector B (which was read immediately after sector A) was obtained at XX min XX sec 21 ms, then the measured relative time between sectors A and B would be: 21−17=4 ms. This means it took 4 ms for optical head to reach from sector A to sector B on the media, because the media is rotating at a finite speed and the next sector cannot be accessed immediately. Instead, the media must first rotate for some time until the next sector reaches the optical head and the tracking mechanism recognizes it.

So, assuming disc rotation is constant and stable during the measuring process (e.g., 32 ms), the angle between these 2 sectors on the media can be calculated as (4 ms/32 ms)*2*Pi= (Pi/4) radians (45 grads).

Figure 3:
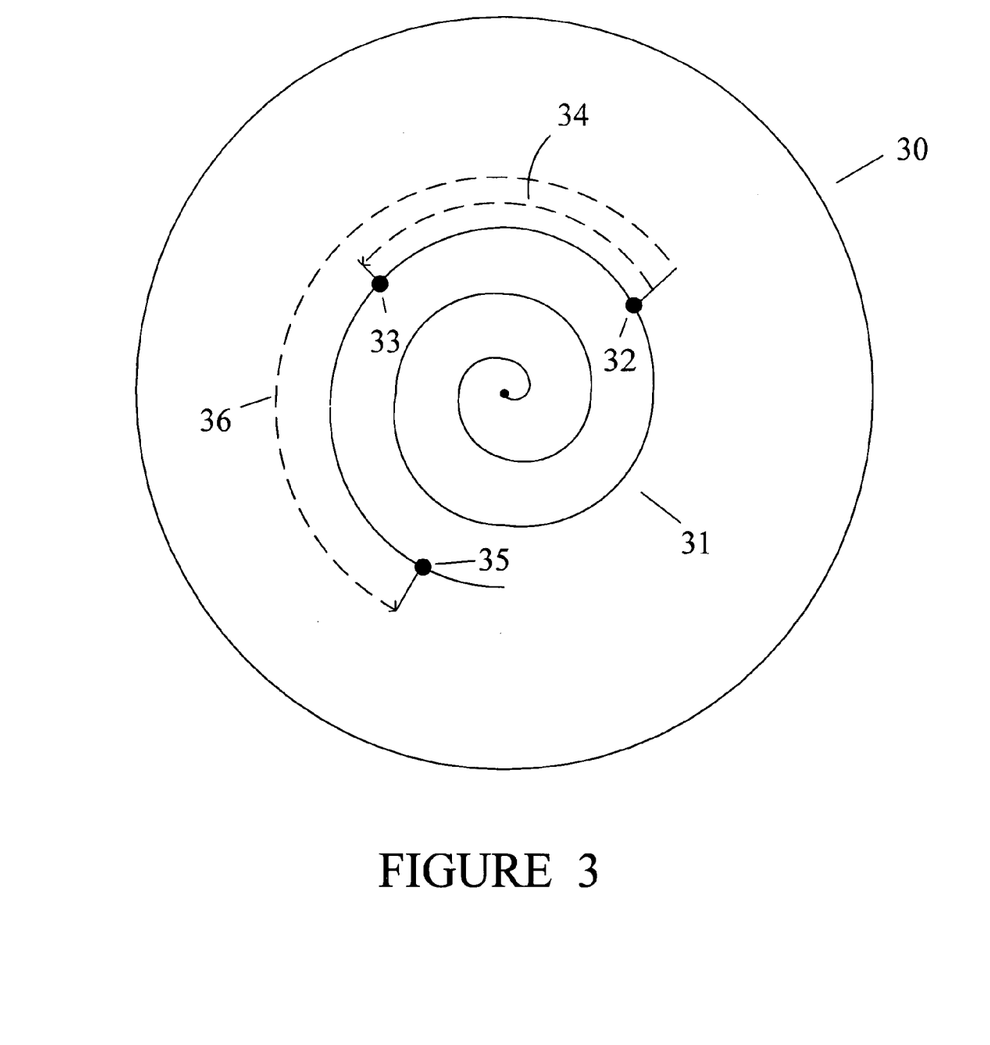
FIG. 3 illustrates the rotating media, the spiral track located thereon, and the angle measurement.

The DPM module thusly measures the location of each sector on the rotating media, and that location is represented by the radial angle as measured from the first data sector on the spiral track. FIG. 3 illustrates this aspect of the invention—a rotating media 30 has thereon a spiral track 31. At some point along spiral track 31 a first data sector 32 is located. A second data sector 33 and a third data sector 35 are located further along spiral track 31. A second data sector angle 34 represents the radial distance along the spiral track from the first data sector 32 to the second data sector 33. A third data sector angle 36 represents the radial distance along the spiral track from the first data sector 32 to the third data sector 35. It should be noted that FIG. 3 is a simplified illustration of spiral track 31. In reality, of course, the number of turns of spiral track 31 and the data sector density along spiral track 31 can be much greater.

Special considerations are taken into account to eliminate caching of data inside the media-reading device, and additional perspective on these special considerations follows:

Most devices perform internal caching of data and may return data from cache memory instead of media, which will result in incorrect timing information. To fix this problem, when possible a FUA (Force Unit Access) bit is used on the READ10 and READ12 commands mentioned above, or an attempt is made to disable the device caching by sending a MODE SELECT command with caching page parameters. MODE SELECT commands are provided in SBC-2—the standard second-generation command set for block-oriented direct-access devices such as magnetic disk drives. Specific information about the SBC-2 block command set follows: {Date: 2004/11/13, Rev: 16, Status: Published, Project: 1417-D, File: sbc2r16.pdf (170146 bytes)}. In particular, see the 6.3.3 caching mode page in this SBC-2 draft.

For example, if device caching is bypassed by the above method, then the rotation speed at the current location can be easily calculated by reading the same sector many times and measuring the relative time it takes for these readings—because to be able to read the same sector again directly from the media, the optical head mechanism must wait for one full rotation cycle of the media, and this time is exactly measurable.

If neither of these methods is possible, then the DPM measurement module tries to reset the media-reading device cache (i.e., remove the measured sectors from the internal device cache memory) by reading sectors from another media region in order to fill the device cache to its full limit. This will guarantee that current sectors will be discarded from the cache, and the next attempt to read the desired sector will result in direct access to the media, which is necessary for the measurement process.

By knowing the timing response of all non-cached reads from the media, and the media's rotation speed, it is possible to calculate the relative position of all physical sectors on the media and reconstruct the physical angles of all sectors on original media, i.e. how sectors are distributed along the spiral track on the physical level.

As a first step, measurements are performed at several control points on media in order to identify general spiral curve parameters: timing data and rotation speeds are mathematically analyzed and approximate coefficients of spiral curve equation are identified.

If we assume the spiral starts at the center of the media, the spiral can be represented by a generally known equation in the form:

$$R = p*N,$$

where:
R is the radius (in millimeters),
p is the current track pitch (assumed to be constant), and
N is the number of rotations along spiral track.

If the number of rotations is large enough, then the length of the spiral from the center of the media to the current radius can be calculated as:

$$l = Pi*p*N*N.$$

As an example, the sectors on a standard CD/DVD are recorded along the physical track, beginning near a radius of 25 mm and spiraling outward to a radius near 59 mm.

| Parameters for standard media | CD | DVD |
|---|---|---|
| Track pitch (mm) | 0.00160 | 0.00074 |
| Number of rotations up to inner/outer circle (if we assume that spiral goes from disk center): | 15625/36875 | 33784/79730 |
| Approximate number of sectors per rotation on inner/outer circle: | 10/23 | 30/70 |

This shows how the sector density (number of sectors per one rotation) on the media changes along the spiral.

Mathematically, the sector density (depending on its address—LBA or Logical Block Address) can be described approximately with the following equation:

$$y = SQRT(k1 + k2*x),$$

where x is logical sector address on media (LBA) and y is sector density at this location on media. k1 and k2 are curve coefficients that vary depending on the type of media.

For example, on a standard CD, media k1 is around 100 and k2 is around 0.00128

Thus at start of the CD (LBA 0), we have:

$$N\text{start} = SQRT(100+0.00128*0) = 10 \text{ sectors per one media rotation}$$

and at the end of the media (typically it is 330000 sectors for 74 min CD media), we have:

$$N\text{end} = SQRT(100+0.00128*330000) = 22.9 \text{ sectors per one media rotation}$$

The measurement of these coefficients (k1 and k2) is exactly what the DPM process does when it identifies the general initial parameters and how the sectors are distributed along the spiral track. As this equation has 2 unknown coefficients, then mathematically it is enough to measure the sector density at 2 distant points in the media (normally at the start and end of the media), and this equation can easily be solved to give us these curve coefficients. After this, we can calculate approximately the sector density at any point of the media, provided the mentioned spiral is ideal and no anomalies are present.

Knowing the sector density at different media locations, in its turn, allows one to calculate the relative angle position of all sectors.

The second step is fine tuning the curve parameters by performing measurements at some intervals along the track and gathering statistical data of sector timings. This data is then mathematically analyzed and smoothed by using interpolation and nonlinear regression methods.

The sector density measurements are performed along some interval on the track, and a two-dimensional array is built where X represents the sector address (LBA) and Y represents the density at this address in floating point format, which should follow approximately the above mentioned equation (y=SQRT(k1+k2*x)). The actual data is then analyzed by means of a nonlinear regression method, in such a way that the values of k1 and k2 are found that best fit the measured data. This is generally known as a curve-fitting process.

Nonlinear regression is a general technique to fit a curve through measured data. It fits data to any equation that defines Y as a function of X and one or more parameters (2 in our case). It finds the values of those parameters that generate the curve that comes closest to the data (minimizes the sum of squares of the vertical distances between data points and curve). This is used to identify the coefficients k1 and k2 more precisely (as the initial definition at two control points was only approximate).

These smoothing techniques in fact are standard and generally known. Currently the Levenberg-Marquardt method is used, but any curve-smoothing technique that fulfills the above-stated purpose can be used. For reference, a further explanation of the mathematical smoothing methods may be found at http://www.curvefit.com/introduction.htm, and a further explanation of the Levenberg-Marquardt method may be found at http://mathworld.wolfram.com/Levenberg-MarquardtMethod.html.

After the curve parameters are defined precisely, then all data is analyzed again and the sector density at each measured point is compared with the expected data that the curve equation must produce at this place. If this data is within measurement accuracy range, then the calculated data is used as the base value and stored in the final table (i.e., the smoothed value is used). If some data is out of range but not systematic (e.g., one density is above the estimated value and other is below), then such deviation can be considered as statistical deviation from the calculated value, and the smoothed value may still be used. Otherwise (if there are systematic deviations from estimated sector density in some region), this is considered as an anomaly and the region in question may be re-measured more precisely to get more correct density values.

Finally, the resulting curve angle table is stored in a media descriptor file (MDS), based on the measured density values. Each element of the table represents the absolute physical angle of a given sector measured from the first sector on the media—one rotation along the spiral track (2*Pi radians) being represented by hex value 0x100 (256 decimal).

Further information about a typical MDS file, measured on CD-ROM media, follows (the MDF file portion of the image, which contains the media data content, is omitted for convenience):

This MDS file portion of the image was produced from CD-ROM media which has 315900 sectors in total. The angle table inside this MDS file starts at file offset 0x01EE and contains the following header bytes:

| 01 00 00 00 | 00 00 00 00 | F4 01 00 00 | 76 02 00 00 |
|---|---|---|---|
| ↑ | ↑ | ↑ | ↑ |
| Identificator of angle table in MDS specification | Start of table (i.e. LBA 0) | Step of table (0x1F4, i.e. 500 sectors) | Number of entries (0x276, i.e. 630 entries) |

It can be seen the angles in this table were measured from the start of the CD (LBA 0), and the table contains 630 angles for each angle with step 500.

The first 16 entries of a typical angle table that would follow the above header bytes are shown below:

| 000001FE: | 66 37 00 00 | 9D 6E 00 00 | A4 A5 00 00 | 7E DC 00 00 |
|---|---|---|---|---|
| 0000020E: | 29 13 01 00 | A5 49 01 00 | F4 7F 01 00 | 18 B6 01 00 |
| 0000021E: | 0F EC 01 00 | DA 21 02 00 | 78 57 02 00 | EC 8C 02 00 |
| 0000022E: | 35 C2 02 00 | 55 F7 02 00 | 4A 2C 03 00 | 15 61 03 00 |

Thus it can be seen that the angle of sector 500 (relative from start) is 0x3766. The angle of sector 1000 is 0x6E9D, the angle of sector 1500 is 0xA5A4, and so on. One can see that the angle increments as we move along the spiral and measure the resulting angle after each 500th sector. Every rotation is represented by the hexadecimal value 0x100 (256), so it can also be seen that the media will perform 0x37 (55 decimal) full rotations if we go along the track from sector 0 to sector 500, and that sector 500 is shifted by the relative angle 0x66 from sector 0 (i.e., around 143 degrees).

The angles of all the intermediate sectors lying between the 'step' sectors are identified by simple linear interpolation, if needed. It is assumed that a 500 sector step is small enough in the current situation to represent visible changes in sector density, so linear interpolation for an intermediate value can be afforded without any significant loss of accuracy.

Figure 4:
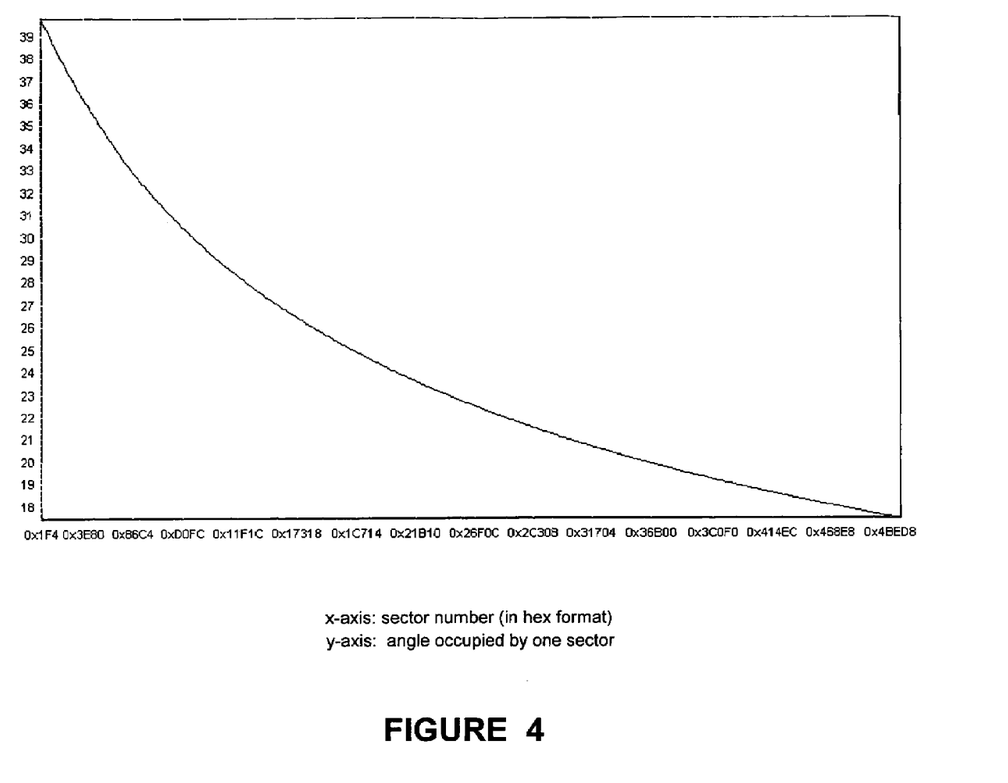
FIG. 4 is a graph of the information in the angle chart.

FIG. 4 graphically displays the angle information in the form of sector density. This figure displays the curve representing sector density (its reciprocal value, to be more correct). The X axis represents the sector number in hex format, and the Y axis represents the angle occupied by one sector.

At sector 500 we have hex angle 0x3766 (14182), so the hex angle of one sector is 14182/500=28.36. Since the hex angle 0x100 represents 360 degrees, then it is equal to 28.36*360/256=39.88 degrees per sector as you can see on the FIG. 4 graph. And so on. The greater the sector number, the greater the radius of the spiral, so more sectors fit into one rotation (sector density is higher) and the angle occupied by one sector is smaller. On the outer side of the media, it is almost 18 degrees per sector.

Further discussion of the relationship among sector density, the angle occupied by one sector, and the absolute angle of a sector relative to the start of the media follow:

The sector density term discussed in this specification just means: the number of data sectors that fit on one round of the spiral track. The greater the radius (the further along the spiral track), the more data sectors can fit. If we know there are 30 sectors on one rotation at a particular place on the spiral track (i.e. density is 30 in these terms), then it means the angle occupied by one sector is 360/30=12 degrees at this point on the media. In other words, sector density is a function reciprocal to the angle occupied by one sector. The higher the sector density at a particular place, the smaller the angle occupied by one sector, and vice versa.

The X-axis of FIG. 4 displays the sector number—lesser values indicate a location closer to the media center, and greater values indicate a location closer to the end of the media (outer rim). The Y axis displays the angle occupied by one sector at this location.

From the angle table in the MDS file, this can be calculated as follows (decimal values are used for simplicity):

If the angle of sector X (relative from start of media) is, for example, 14182 and the angle of sector X+500 is 28317 (according to the angle table in the MDS file), then the angle occupied by one sector at this location is (28317−14182)/500=28.27.

Note that one rotation in the angle table is represented as the value of 256. This just means that the angle occupied by one sector is (28.27/256)*360=39.75 degrees. This is exactly the value that is displayed in Y axis in FIG. 4. Speaking in terms of sector density, we would say: the sector density at this location is 360/39.75=9.06, i.e., every rotation along the spiral occupies around 9 sectors.

If you know the sector density you can build the angle table, and vice versa: if you have the angle table you can get the sector density. Thus, the angle occupied by one sector and sector density are just two different representations (terminologies) comprising the same subject: media topology.

To build the angle from the sector density, you simply multiply the step of the angle table by the angle occupied by one sector, and add it to previous absolute angle. Using the numbers from the above example: if the absolute angle of sector X is 14182 and we know the sector density at that location is 9.06. (28.27 per sector), then we do just 14182+(500*28.27)=28317.

While the invention provides a method of copying an image of rotating media to a computer's hard drive or semiconductor memory, or to a network, the image may also be copied to other recordable media such as a CD-R, CD-R/RW, DVD±R, DVD±R/RW, etc. This embodiment of the invention is referred to as Recordable Media Physical Signature (hereinafter "RMPS").

RMPS can be incorporated in burning software, such that the burning software reads the angle information of the disk being copied from the media descriptor file, and modifies the data stream written to the recordable media such that the physical signature information of the disk being copied is added to the recordable media. Specialized software can later use this special information for correct reproduction of the original media.

With respect to this embodiment, it may be noted that RMPS, if applied, will be seen on the recorded media only if special firmware or software is not running. Without this special firmware or software, the user will see a modified label which states "NEEDS_EMULATION", and this means that the current media-reading device firmware or system software does not understand RMPS, or this feature is disabled. But once enabled in the media-reading device firmware or via special software, RMPS is transparent to the end user—that is, he will see only the original media contents with original label etc. Thus, applying RMPS to media assumes lossless data modification.

RMPS can add data to media in a lossless way because it finds some empty region on the media (i.e., a region not used by the file system), or some region with a uniform data pattern that can be easily compressed. (e.g., 2000 zero bytes or 2000 bytes with pattern 0xFF etc). The original information at this location is just added to the media information together with the angle table, and the RMPS data is written to the media over this location. Later the information is read from the media with all the needed information, and the original data is virtually restored over this region as if it never existed.

Practically every media has some empty or reserved regions, so this methodology is usable in most cases. In case there is not enough free room, the RMPS data can be written beyond the end of the media (last sector) and all the original data can still be restored.

CONCLUSIONS, RAMIFICATIONS, AND SCOPE

Thus the reader will see that the method of the invention provides makes it possible to reproduce exact media behavior (content, timings, etc.) without losing the originality of the behavior, which makes the invention's image format and method unique among other methods of creating a media image.

While the above descriptions contain many specificities, these shall not be construed as limitations on the scope of the invention, but rather as exemplifications of embodiments thereof. Many other variations are possible without departing from the spirit of the invention. Examples of just a few of the possible variations follow:

The diagram of FIG. 2, and the components shown therein, are those of a typical personal computer. However, the apparatus for executing the method is not confined to a personal computer, but instead may be any suitable apparatus or apparatuses that can execute the method on rotating media.

The angles of the data sectors do not have to be measured from the first data sector, as in the embodiment herein described. Instead, the angles can be measured from, for example, the last data sector, any data sector in between the first and last, or any other suitable reference point along the spiral track. More than one reference point might also be used, as long as the location of each reference point, which particular data sectors are being measured from that reference point, are known.

Although the description mentions many different types of media to which the image file may be written, the invention is not confined to writing the image file to those media. Instead, the image file may be written to any suitable media, including those not yet developed.

Accordingly, the scope of the invention should be determined not by the embodiments illustrated, but by the appended claims and their legal equivalents.

What is claimed is:

1. A method of storing rotating media data in an image file, said method comprising the steps of:
   (a) sending commands to a media-reading device containing said rotating media;
   (b) measuring the relative execution time of said commands;
   (c) calculating radial angle positions of a plurality of data sectors located along a spiral track on said rotating media, said radial angle positions being relative to at least one predetermined reference point on said spiral track;
   (d) storing said radial angle positions in said image file.

2. The method of claim 1, wherein said predetermined reference point is the first data sector along said spiral track.

3. The method of claim 1, wherein the content of said data sectors is also stored in said image file.

4. The method of claim 1, wherein the content of said data sectors is stored in a separate image file.

5. The method of claim 1, wherein said calculating step also comprises determining a rotation speed of said rotating media.

6. The method of claim 1, wherein said calculating step also comprises determining an equation that mathematically describes said spiral track.

7. The method of claim 1, wherein said method also comprises a step wherein said image file is copied to a memory element or other media.

8. The method of claim 1, wherein said method also comprises a step wherein said image file is transmitted over a network or the Internet.

9. The method of claim 1, wherein data caching by said media-reading device is disabled or bypassed.

10. A system that stores rotating media data in an image file, said system comprising:

(a) means for sending commands to a media-reading device containing said rotating media;

(b) means for measuring the relative execution time of said commands;

(c) means for calculating radial angle positions of a plurality of data sectors located along a spiral track on said rotating media, said radial angle positions being relative to at least one predetermined reference point on said spiral track;

(e) means for storing said radial angle positions in said image file.

11. The system of claim 10, wherein said predetermined reference point is the first data sector along said spiral track.

12. The system of claim 10, wherein the content of said data sectors is also stored in said image file.

13. The system of claim 10, wherein the content of said data sectors is stored in a separate image file.

14. The system of claim 10, wherein said system also comprises means for determining a rotation speed of said rotating media.

15. The system of claim 10, wherein said system also comprises means for determining an equation that mathematically describes said spiral track.

16. The system of claim 10, wherein said system also comprises means for copying said image file to a memory element or other media.

17. The system of claim 10, wherein said method also comprises means for transmitting said image file over a network or the Internet.

18. The system of claim 10, wherein data caching by said media-reading device is disabled or bypassed.

19. A method of storing rotating media data in an image file, said method comprising the steps of:

(a) determining a radial angle position of at least one data sector on said rotating media;

(b) determining at least a portion of the actual data content of said rotating media;

(c) storing said radial angle position of at least one data sector on said rotating media and said at least a portion of the actual data content of said rotating media in an image file or files.

20. The method of claim 19, wherein said method also comprises a step wherein said image file is copied to a memory element or other media, or transmitted over a network or the Internet.

\* \* \* \* \*